US010528459B2

(12) United States Patent
Wang et al.

(10) Patent No.: US 10,528,459 B2
(45) Date of Patent: Jan. 7, 2020

(54) SCALABLE SPACE MANAGEMENT USING BITMAP SUMMARY TREE

(71) Applicant: VMware, Inc., Palo Alto, CA (US)

(72) Inventors: Wenguang Wang, Santa Clara, CA (US); Yunshan Lu, San Jose, CA (US)

(73) Assignee: VMware, Inc., Palo Alto, CA (US)

( * ) Notice: Subject to any disclaimer, the term of this patent is extended or adjusted under 35 U.S.C. 154(b) by 320 days.

(21) Appl. No.: 14/713,698

(22) Filed: May 15, 2015

(65) Prior Publication Data

US 2016/0334997 A1    Nov. 17, 2016

(51) Int. Cl.
*G06F 12/02*    (2006.01)
*G06F 3/06*    (2006.01)
*G06F 9/50*    (2006.01)
*G06F 9/455*    (2018.01)

(52) U.S. Cl.
CPC .......... *G06F 12/023* (2013.01); *G06F 3/0605* (2013.01); *G06F 3/0608* (2013.01); *G06F 3/0665* (2013.01); *G06F 3/0689* (2013.01); *G06F 9/5016* (2013.01); *G06F 2009/45583* (2013.01)

(58) Field of Classification Search
None
See application file for complete search history.

(56) References Cited

U.S. PATENT DOCUMENTS

| | | | |
|---|---|---|---|
| 6,070,172 A * | 5/2000 | Lowe | G06F 3/0608 |
| 2008/0104357 A1* | 5/2008 | Kim | G06F 12/0246 |
| | | | 711/170 |
| 2010/0125583 A1* | 5/2010 | Casper | G06F 17/30067 |
| | | | 707/745 |

OTHER PUBLICATIONS

Brent, Efficient implementation of the first-fit strategy for dynamic storage allocation, Jul. 1989, ACM Transactions on Programming Languages and Systems (TOPLAS), vol. 11 Issue 3, pp. 388-403.*

* cited by examiner

*Primary Examiner* — Charles J Choi
(74) *Attorney, Agent, or Firm* — Patterson + Sheridan, LLP

(57) ABSTRACT

Systems and methods for allocating space in persistent storage are provided. A modified bitmap and a tree of bitmap summary pages are used to manage the free space of a large scale storage system. The bitmap is separated into fixed size pages and has bitmap summary entries to summarize the information in the bitmap. Bitmap summary pages can be further summarized into secondary summary pages. The tree data structure can continue to N levels until a topmost level has one bitmap summary page.

9 Claims, 4 Drawing Sheets

US 10,528,459 B2

SCALABLE SPACE MANAGEMENT USING BITMAP SUMMARY TREE

BACKGROUND

Dynamically allocating space on disk or storage is important for computing system reasons. Disk storage, in contrast to volatile memory, permits data to persist over time, even after the computing system is powered down or shut down. In recent computer systems, the amount of data stored within file systems is constantly increasing. For example, storage systems may have multiple disks of many terabytes (TBs) of storage space. Nevertheless, the need remains in storage systems to allocate storage dynamically. In many cases, sizes of memory being requested are unknown until the time of the request. The lifetime for a dynamically allocated block may also be unknown. While techniques for allocating space in memory have been developed, such approaches are generally inapplicable to managing storage persistently due to the differences in size capacity and speed between storage and memory. A memory allocation algorithm would generally require too much memory and be too slow when directly used for storage. As such, storage systems or file systems need some mechanism for remembering which storage blocks have been allocated and which are not.

BRIEF DESCRIPTION OF THE DRAWINGS

So that the manner in which the above recited aspects are attained and can be understood in detail, a more particular description of embodiments of the disclosure, briefly summarized above, may be had by reference to the appended drawings.

DETAILED DESCRIPTION

One or more embodiments disclosed herein provide methods, systems, and computer programs for persistently managing space in a storage device. One known technique for remembering which storage blocks in a storage system have been allocated (and which are not), is to use a bitmap, a small data structure where each bit can represent whether an associated block is allocated or not. However the use of a simple bitmap has become prohibitively expensive as disks and disk capacities have gotten bigger. For example, a 1-byte (e.g., 8 bits) bitmap can manage the allocation state of 8 blocks. Each block on disk typically has a 4 kB size. So each byte of a bitmap can manage $2^{15}$ bits ($8*4*1024=2^3*2^2*2^{10}=2^{15}$) of disk space. To manage the allocation state of all space on a 4 TB disk (4 TB=$2^2*2^{40}=2^{42}$ bits), a system would need approximately 128 MB per 4 TB disk (i.e., $2^{42} \div 2^{15} = 2^{42-15} = 2^{27} = 128$ MB). On a typical modern storage system, for example, a storage array having 16 disk drives, the storage system would need over 2 GB of bitmaps to manage the allocation state of the entire capacity of the storage system. A bitmap of this size may be prohibitively expensive to search as the entire bitmap would be loaded into memory and is generally searched using a linear algorithm.

Accordingly, embodiments of the present disclosure provide a modified bitmap scheme that uses an auxiliary tree data structure to more quickly allocate space. Embodiments include a tree of bitmap summary pages to manage the free space of a large scale storage system. The described system separates a bitmap into fixed size pages and uses a bitmap summary entry to summarize the information in the bitmap. Bitmap summary pages can be further summarized into second-level summary pages. The levels of the tree data structure may continue until a top level has one bitmap summary page. With the described bitmap summary, three embodiments of the present disclosure can have a running time of O(log(N)) to satisfy any allocation and free request, and can even achieve first-fit allocation in O(log(N)) time.

Figure 1:
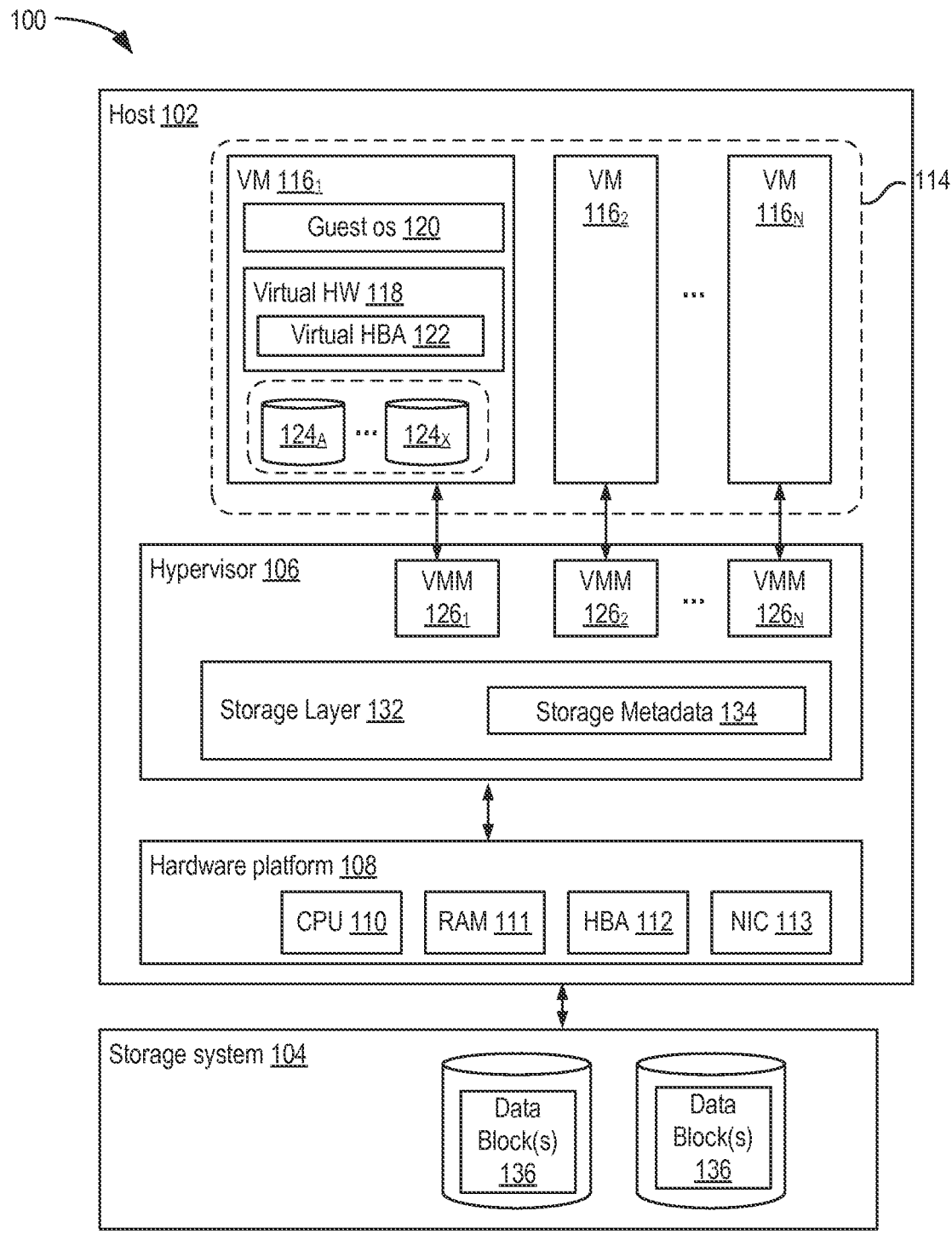
FIG. 1 is a block diagram that illustrates a computer system in which one or more embodiments may be utilized.

FIG. 1 is a block diagram that illustrates a computer system 100 according to one or more embodiments of the present disclosure. Computer system 100 includes one or more hosts 102 configured to provide a virtualization layer that abstracts processor, memory, storage, and networking resources of a hardware platform 108 into multiple virtual machines (VMs) 116 that run concurrently on the same host 102. VMs 116 run on top of a software interface layer, referred to as a hypervisor 106, that enables sharing of the hardware resources of host 102 by VMs 116. One example of hypervisor 106 is a VMware ESXi hypervisor provided as part of the VMware vSphere solution made commercially available from VMware, Inc.

Host 102 may comprise a general purpose computer system having one or more virtual machines accessing data stored on a storage system 104 communicatively connected to host 102. Host 102 may be constructed on a conventional, typically server-class, hardware platform 108. Hardware platform 108 of host 102 may include conventional physical components of a computing device, such as a processor (CPU) 110, a memory 111, a disk interface 112, and a network interface 113. Processor 110 is configured to execute instructions, for example, executable instructions that perform one or more operations described herein and may be stored in memory 111. Memory 111 and storage system 104 are devices allowing information, such as executable instructions, cryptographic keys, virtual disks, configurations, and other data, to be stored and retrieved. Memory 111 may include, for example, one or more random access memory (RAM) modules. Storage system 104 may include one or more locally attached storage devices, for example, one or more hard disks, flash memory modules, solid state disks, and optical disks. In some embodiments, storage system 104 may include a shared storage system having one or more storage arrays of any type such as a network-attached storage (NAS) or a block-based device over a storage area network (SAN). Disk interface 112, such as a host bus adapter (HBA), enables host 102 to communicate with a storage device, such as storage system 104, to store "virtual disks" that are accessed by VMs 116, as described later. Network interface 113 enables host 102 to communicate with another device via a communication medium, such as a communication network (not shown). An example of network interface 113 is a network adapter, also referred to as a Network Interface Card (NIC).

While storage system 104 is typically made up of a plurality of disks, other forms of storage, such as solid-state non-volatile storage devices, may be used, and the use of the term, "disk" herein, should therefore not be construed as limited only to rotating disk storage media, but also what is become known as solid state disks, or "SSDs." In some embodiments, storage system 104 may be comprised of high-density non-volatile memory. Furthermore, while storage system 104 is depicted as a separate, external component to host 102, storage system 104 may be internal to host 102, for example, a local storage device or locally attached storage.

As shown in FIG. 1, a hypervisor 106 is installed on top of hardware platform 108 and supports a virtual machine execution space 114 within which multiple virtual machines (VMs) $116_1$-$116_N$ may be instantiated and executed. Each such virtual machine $116_1$-$116_N$ implements a virtual hardware platform 118 that supports the installation of a guest operating system (OS) 120 which is capable of executing one or more applications (not shown). Examples of a guest OS 120 include any of the well-known commodity operating systems, such as Microsoft Windows, Linux, and the like. In each instance, guest OS 120 includes a native file system layer, for example, either an NTFS or an ext3 type file system layer. These file system layers interface with virtual hardware platforms 118 to access, from the perspective of guest operating systems 120, a data storage HBA, which in reality, is virtual HBA 122 implemented by virtual hardware platform 118 that provides the appearance of disk storage support (in reality, virtual disks $124_A$-$124_X$) to enable execution of guest OS 120 transparent to the virtualization of the system hardware. A virtual disk 124 exposes the same abstraction as a real (physical) disk, that is, a linear list of sectors; however, a VMM may choose to implement virtual disks 124 as regular files on the host. Although, from the perspective of guest operating systems 120, file system calls initiated by such guest operating systems 120 to implement file system-related data transfer and control operations appear to be routed to virtual disks $124_A$-$124_X$ for final execution, in reality, such calls are processed and passed through virtual HBA 122 to adjunct virtual machine monitor (VMM) layers $126_1$-$126_N$ that implement the virtual system support needed to coordinate operation with hypervisor 106. In particular, a HBA emulator of each VMM 126 functionally enables the data transfer and control operations to be correctly handled by hypervisor 106 which ultimately passes such operations through its various layers to true hardware HBAs 112 or NIC 113 that connect to storage system 104.

Hypervisor 106 includes a storage layer 132 configured to manage storage space persistently for VMs 116 via VMM layers $126_1$ to $126_N$. In one embodiment, storage layer 132 may include numerous logical layers, such as an I/O virtualization layer, a file system driver, and a disk access layer. In some embodiments, the I/O virtualization layer receives a data transfer and control operation (in the form of I/O commands, for example, intended for a virtual disk) from VMM layers $126_1$ to $126_N$, and converts the operations into file system operations that are understood by a virtual machine file system (VMFS) driver in order to access a file stored in underlying storage under the management of the VMFS driver that represents virtual disk 124. The I/O virtualization layer then issues these file system operations to the VMFS driver. The VMFS driver, in general, manages creation, use, and deletion of files (e.g., such as .vmdk files representing virtual disks) stored on physical locations of, or in logical volumes or Logical Unit Numbers (LUNs) exposed by, storage system 104. The VMFS driver converts the file system operations received from the I/O virtualization layer to raw SCSI operations, which are issued to a data access layer that applies command queuing and scheduling policies to the raw SCSI operations and ultimately sends the raw SCSI operations to components of physical hardware platform 108. While storage layer 132 is depicted as part of a virtualized architecture, it should be recognized that embodiments of the present disclosure can be extended to other systems having a storage layer. For example, in an alternative embodiment, storage layer 132 may be a file system driver of an operating system that manages storage space persistently for locally attached storage.

It should be recognized that the various terms, layers and categorizations used to describe the virtualization components in FIG. 1 may be referred to differently without departing from their functionality or the spirit or scope of the invention. For example, VMMs 126 may be considered separate virtualization components between VMs 116 and hypervisor 106 (which, in such a conception, may itself be considered a virtualization "kernel" component) since there exists a separate VMM for each instantiated VM. Alternatively, each VMM may be considered to be a component of its corresponding virtual machine since such VMM includes the hardware emulation components for the virtual machine. In such an alternative conception, for example, the conceptual layer described as virtual hardware platform 118 may be merged with and into VMM 126 such that virtual host bus adapter 122 is removed from FIG. 1 (i.e., since its functionality is effectuated by a host bus adapter emulator within VMM 126).

According to one or more embodiments, storage layer 132 maintains storage metadata 134 for facilitating the dynamic allocation of storage blocks 136 (sometimes referred to as disk blocks, disk sectors, or sectors) from storage system 104. Storage layer 132 is configured to receive and/or execute space allocation requests for storage blocks 136 that can used to handle requests to write data to storage system 104. Storage layer 132 uses storage metadata 134 to remember which storage blocks 136 are allocated and which storage blocks are free. In one or more embodiments, storage metadata 134 includes an auxiliary data structure configured to summarize information in underlying bitmap data structures to quickly and compactly determine the allocation state of storage blocks 136. A detailed embodiment of storage metadata 134 is depicted in FIG. 2 and discussed below.

Figure 2:
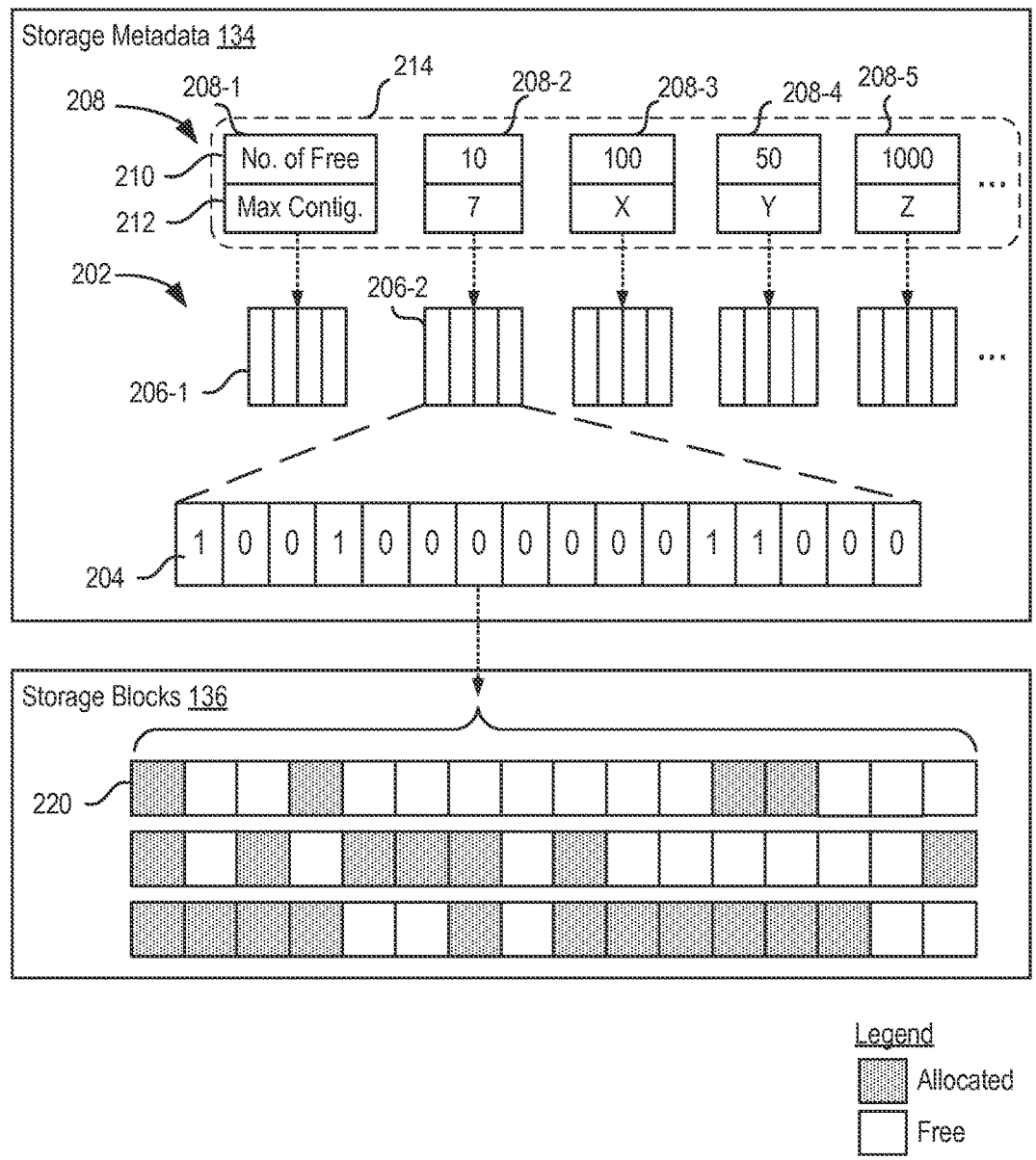
FIG. 2 is a block diagram depicting one embodiment of storage metadata 134, according to one embodiment of the present disclosure.

FIG. 2 is a block diagram depicting one embodiment of storage metadata 134, according to one embodiment of the present disclosure. As shown, storage metadata 134 may include a bitmap 202 having a plurality of bits 204. Each bit 204 corresponds to a storage block 136 and the value of bit 204 represents whether the corresponding storage block has been allocated or is free. For example, one bit value (e.g., zero, logical false) may represent the corresponding storage block is free, and a different bit value (e.g., one, non-zero, logical true) may represent the corresponding storage block allocated. In one implementation, bitmap 202 can implemented as bit array(s), where a sequence of bit values in bitmap 202 maps to a sequence of corresponding storage blocks 136. An index offset of bitmap 202 can be used to simply determine the corresponding storage block. As such, bitmaps provide a compact (i.e., small storage space needed) and simple technique for keeping track of available/free storage blocks.

In one embodiment, bitmap 202 is separated into a plurality of fixed size segments, referred to herein as bitmap pages 206 (e.g., 206-1, 206-2, etc.). In one example, bitmap page 206-2 having bit values beginning as "1001000000011" corresponds to storage blocks 220 where the first storage block is allocated, the second and third storage blocks are free, fourth is allocated, followed by seven contiguous free storage blocks, and so forth, as shown in FIG. 2. The allocation state of other storage blocks 136 are tracked by other bitmap pages 206-1, 206-3, etc.

In one or more embodiments, storage metadata 134 further comprises a plurality of bitmap summary entries 208 (e.g., 208-1, 208-2), sometimes referred to as simply "summary entries". Each bitmap summary entry 208 summarizes the information in a corresponding bitmap page 206. For example, as shown in FIG. 2, bitmap summary entry 208-2 contains a summary of information related to allocation state contained in corresponding bitmap page 206-2. While the correspondence between bitmap page and storage blocks, and between bitmap summary entries and bitmap pages is depicted with dashed arrows for sake of illustration, it should be recognized that the correspondences may be implemented using index offsets from a common storage address rather than multiple, individual addresses/references.

Each bitmap summary entry 208 includes a field 210 indicating how many free storage blocks are in the corresponding bitmap page (i.e., how many storage blocks are marked as free by the corresponding bitmap page), and another field 212 indicating a maximum contiguous free extent in the corresponding bitmap page. For example, bitmap summary entry 208-2 indicates the corresponding bitmap page (206-2) has 10 free blocks and a maximum contiguous set of 7 free blocks, while another bitmap summary entry 208-3 indicates the corresponding bitmap page (206-3) has 100 free storage blocks, and so forth.

In one embodiment, a portion of storage metadata 134 is loaded into memory 111 for fast performance of storage allocation requests. For example, the entirety of bitmap summary entries 208 may be loaded into memory, while bitmap pages 206 are largely kept on disk. During operations, certain bitmap page(s) 206 may be selectively loaded into memory as a search for free storage blocks narrows to the particular storage blocks corresponding to the certain bitmap pages Various sizes of pages and entries may be selected to optimize performance of the present technique. In one implementation, each bitmap page may have a size of 4 kB, which indicates the allocation state of $2^{15}$ storage blocks; each bitmap summary entry can be 8 bytes; and 512 summary entries may be grouped into a single 4 kB summary entry page. In one or more embodiments, the plurality of bitmap summary entries 208 may be grouped together into a bitmap summary page 214. As described in later in conjunction with FIG. 4, the present technique may be extended and expanded into a tree of summarized information of multiple levels. That is, multiple bitmap summary pages 214 are summarized by a "higher-level" bitmap summary entry, and so forth.

Figure 3:
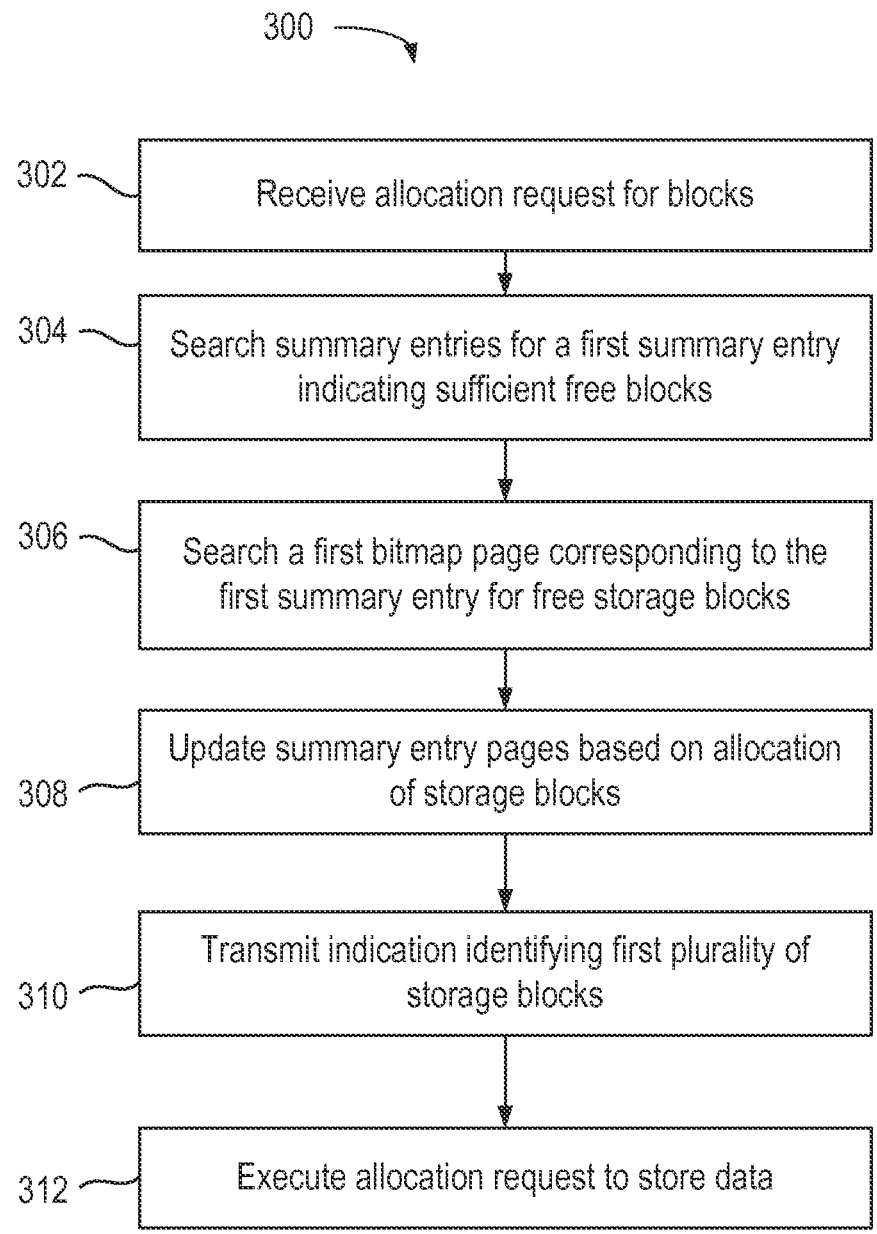
FIG. 3 is a flow diagram illustrating a method for allocating storage space, according to one embodiment of the present disclosure.

In order to speed up space allocation of storage blocks, embodiments of the present disclosure do not linearly search the bitmap outright, as performed in conventional approaches. Rather, embodiments of the present disclosure traverse the tree of summary and bitmap information to identify free storage blocks for storage allocation. FIG. 3 is a flow diagram illustrating a method 300 for allocating storage space, according to one embodiment of the present disclosure. While method 300 is described in conjunction with the system shown in FIGS. 1 and 2, it should be recognized that other systems may be used to perform the described methods.

Method 300 begins at step 302, where storage layer 132 receives a request to dynamically allocate a plurality of blocks (e.g., storage blocks 136) from a storage system 104. The allocation request may be in response to a request to write data to storage system; as such, the data will be written to whichever storage blocks are allocated by method 300. The allocation request may specify the number of blocks desired to be allocated, for example, a request for 49 storage blocks.

At step 304, storage layer 132 searches a plurality of summary entries 208 for a summary entry indicating sufficient free storage blocks for the allocation request. As described earlier, each summary entry 208 corresponds to a bitmap page 206 and includes a field 210 indicating a count of free storage blocks indicated by the corresponding bitmap page. Each summary entry 208 further includes a field 212 indicating the size of the largest contiguous set of storage blocks indicated by the corresponding bitmap page. Storage layer 132 iterates through the plurality of bitmap summary entries 208, checking the count of free storage blocks in the summary entries.

In one embodiment, storage layer 132 may use a first-fit allocation scheme where storage layer 132 selects the first (i.e., first-in-sequence) summary entry encountered that can satisfy the allocation request. That is, when first-fit finds the first (in-sequence) bitmap summary entry whose max contiguous field 212 is not smaller than the requested number of blocks, the first-fit algorithm can stop. In the example in FIG. 2, first-fit would return summary entry 208-3 since summary entry 208-3 is the first summary entry encountered which can satisfy the 49-block allocation request. By way of comparison, a best-fit allocation scheme, where storage layer 132 selects the summary entry having the smallest count of free storage blocks which can satisfy the allocation request, would return summary entry 208-4 because summary entry 208-4 has the closest value (i.e., 50) that could fit the allocation request for 49 blocks. In another embodiment, storage layer 132 may use a worst-fit allocation scheme where storage layer 132 selects the summary entry having the largest count of free blocks which can satisfy the allocation request. In the example of FIG. 2, worst-fit would return summary entry 208-5 (having 1,000 free blocks). Other allocations schemes may be utilized.

Having selected a summary entry, storage layer 132 traverses "down" a level of storage metadata 134 to bitmap 202, and searches the portion of bitmap 202 corresponding to the selected summary entry. As such, at block 306, storage layer 132 searches the bitmap page corresponding to the selected summary entry for a plurality of free storage blocks for the allocation request. As discussed above, the bitmap map includes a plurality of bits 204, each bit 204 corresponding to a storage block 136 and indicating whether the corresponding storage block is free. In one embodiment, storage layer 132 iterates through bits 204 of the select bitmap page, checking the bits for a set of bits (e.g., sequence of contiguous bits) that can satisfy the allocation request.

Under the first-fit allocation scheme, storage layer 132 allocates the first (i.e., first-in-sequence) set of free contiguous storage blocks encountered that can satisfy the allocation request. Under worst-fit, storage layer 132 allocates (all or part of) the largest set of free storage blocks that can satisfy the allocation request. Accordingly, using the bitmap summary tree described herein, embodiments of the present disclosure advantageously takes O(log(N)) time to satisfy any allocation and free request. Notably, embodiments of the present disclosure achieve first-fit allocation in O(log(N)) time, which typically has a worst case running time of O(N) in traditional approaches with a bitmap. Embodiments of the present disclosure also achieve worst-fit allocation in O(log(N)) time as embodiments are able to search the largest contiguous free extent.

At step 308, storage layer 132 updates summary entry pages 208 based on the allocation of storage block. In some embodiments, storage layer 132 updates the selected bitmap page by marking bits 204 of the selected bitmap page as allocated, for example, by setting to the value of 1. Storage layer 132 then decreases the count of free storage blocks of the first summary page, for example, by subtracting the number of allocated storage blocks from field 210 of the selected summary entry. If needed, storage layer 132 may update the indication of the maximum contiguous extent in the selected bitmap page, for example, by subtracting the number of allocated storage blocks from field 212 if the allocation was made to that largest contiguous extent.

At step 310, storage layer 132 transmits an indication identifying the first plurality of free storage blocks have been allocated to satisfy the allocation request. At step 312, storage layer 132 may executes the allocation request to store data in the first plurality of storage blocks.

Figure 4:
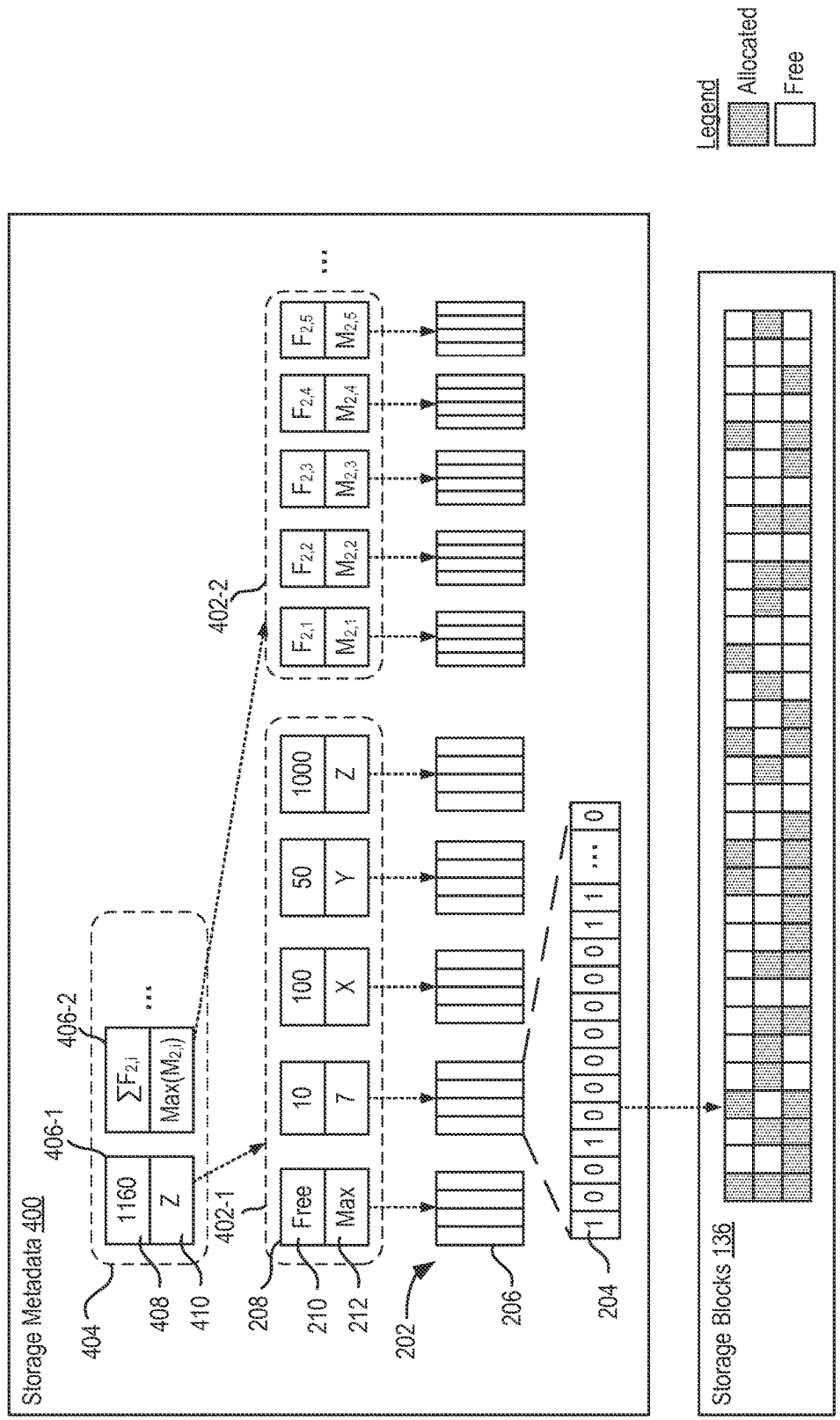
FIG. 4 is a block diagram depicting another embodiment of storage metadata 400, according to one embodiment of the present disclosure.

As mentioned above, the present technique may be extended and expanded into a tree of summarized information of multiple levels, depending on the capacity of storage system 104 and the number of storage blocks to be tracked. FIG. 4 is a block diagram depicting another embodiment of storage metadata 400, according to one embodiment of the present disclosure. Storage metadata 400 is a tree data structure similar to storage metadata 134 described above (i.e., having summary entries 208 that summarize information in bitmap pages 206 indicating whether underlying storage blocks 136 are free or allocated). Bitmap summary entries 208 are grouped together into fixed size "primary" bitmap summary pages 402 (also referred to as a primary summary page). In the embodiment shown, storage metadata 400 includes at least one primary summary page 402-1 and another primary summary page 402-2. The additional summary pages (402-2, etc.) may be necessitated by a larger capacity storage system having more storage blocks (compared to the embodiment shown in FIG. 2), which requires additional bitmap pages, which in turn means additional bitmap summary entries that cannot fit into a single fixed size summary page 402.

In one or more embodiments, primary summary pages 402 are further summarized by a fixed-size, second-level, or "secondary", summary page 404 having a plurality of secondary summary entries 406. While two levels (i.e., primary and secondary) of summarized information are depicted in FIG. 4, the levels of information may continue until the topmost level is made of a single fixed size bitmap summary page. Secondary summary entries 406 are similar to primary summary entries 208, except that secondary summary entries 406 summarize information for a corresponding primary summary page 402. In one embodiment, each secondary summary entry 406 includes a field 408 indicating an aggregate count of all free storage blocks as summarized by the primary summary entries in the corresponding primary summary page. For example, the field for secondary summary entry 406-1 has a count of 1,160 free blocks (i.e., 10+100+50+1,000) based on underlying primary summary page 402-1. In a more generalized example, the field for secondary summary entry 406-2 has a sum of fields 210 of the primary summary entries (i.e., $\Sigma F_{2,i}$) in underlying primary summary page 402-2.

In some embodiments, each secondary summary entry 406 further includes a field 410 indicating a maximum contiguous length of free storage blocks among the bitmap pages underlying the primary bitmap summary entries (according to the summary information in the primary bitmap summary entries themselves). For example, field 410 for secondary summary entry 406-2 indicates a maximum value of fields 212 of the primary summary entries (i.e., $Max(M_{2,i})$ in underlying primary summary page 402-2 corresponding to secondary summary entry 406-2. In some cases, when different bitmap pages are placed together (i.e., adjacency), a larger contiguous set of blocks may appear. For example, a trailing set of free space in one bitmap page can "merge" with the leading free space in a next bitmap page to form a larger contiguous length of free storage blocks (which could be reflected in field 410 of higher level summary entries). In some embodiments, summary entries 406 may intentionally ignore the possibility of an inaccurate maximum contiguous length in summary pages 402 and in the summary of summary pages (e.g., fields 412 in summary entries 406) because the added complexity may not outweigh any small additional benefit of a very accurate maximum contiguous length field.

During operation, storage layer 132 performs a method similar to method 300 described earlier. In one embodiment, a portion of storage metadata 400 is pre-loaded into memory 111 and paged in on-demand for fast performance of storage allocation requests. For example, the entirety of secondary bitmap summary page 404 may be loaded into memory, while primary bitmap summary pages 402 and bitmap pages 206 are largely kept on disk. During operations, certain primary bitmap summary pages 402 and bitmap page(s) 206 are selectively paged on-demand into memory as a search for free storage blocks narrows to particular primary bitmap summary pages and then to the particular storage blocks corresponding to the certain bitmap pages. Responsive to an allocation request for N storage blocks, storage layer 132 searches the topmost level of summary entries for a summary entry indicating sufficient free storage blocks for the allocation request. That is, storage layer 132 iterates through secondary summary entries 406 for a particular summary entry indicating sufficient free storage blocks for the allocation request. Storage layer 132 traverses down to primary summary page 402 corresponding to the particular secondary summary entry, and iterates through primary summary entries 208 within that primary summary page 402, as described above in steps 304 and 306 of method 300.

Upon satisfying the allocation request, storage layer 132 updates the multiple levels of the bitmap summary tree to reflect that free storage blocks have been allocated. That is, storage layer 132 updates field 210 of a primary summary entry 208 to decrease the count of free storage blocks, and then update field 408 of a secondary summary entry 406 corresponding to that primary summary entry. Similarly, if needed, storage layer 132 may update field 212 of a primary summary entry 208 to change the maximum length of contiguous free blocks, and then update field 410 of secondary summary entry 406 corresponding to that primary summary entry.

Although discussed above in conjunction with a specific stack of virtualization layers, techniques described herein are not limited thereto and may be extended to embodiments where storage devices (e.g., storage 104) are configured to handle storage allocation and other such operations. In such embodiments, one or more of the described operations of storage layer 132, for example, may be implemented and executed instead by the underlying physical storage device itself.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application runs. It should be noted that these embodiments may also apply to other examples of contexts, such as containers not including a guest operating system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in userspace on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O.

The various embodiments described herein may employ various computer-implemented operations involving data stored in computer systems. For example, these operations may require physical manipulation of physical quantities usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs) CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims.

What is claimed is:

1. A method comprising:
  receiving an allocation request for a plurality of blocks from a storage system;
  searching a plurality of secondary summary entries for a secondary summary entry indicating sufficient contiguous free storage blocks for the allocation request, wherein each of the secondary summary entries corresponds to a plurality of primary summary entries, wherein each of the secondary summary entries comprises (i) an aggregate count of free storage blocks as summarized by a plurality of entries in the corresponding plurality of primary summary entries and (ii) an indication of a size of a largest contiguous set of free storage blocks among storage blocks corresponding to the corresponding plurality of primary summary entries;
  identifying, based on searching the plurality of secondary summary entries, a first secondary summary entry corresponding to a first plurality of primary summary entries comprising a first primary summary entry and a second primary summary entry, wherein for the first secondary summary entry, storage blocks of the largest contiguous set of free storage blocks correspond to storage blocks associated with the first primary summary entry and to storage blocks associated with the second primary summary entry;
  based on identifying the first secondary summary entry, searching the first plurality of primary summary entries for a primary summary entry indicating sufficient contiguous free storage blocks for the allocation request, wherein each of the primary summary entries corresponds to a respective bitmap page comprising a plurality of bits, each of the bits corresponding to a respective storage block and indicating whether the corresponding storage block is free, and wherein each of the primary summary entries comprises (i) a count of free storage blocks indicated by the corresponding bitmap page and (ii) an indication of a size of a largest contiguous set of free storage blocks indicated by the corresponding bitmap page, the indication of the largest contiguous set of free storage blocks being distinct from the count of the free storage blocks;

based on not identifying a single primary summary entry of the first plurality of primary summary entries indicating sufficient contiguous free storage blocks for the allocation request, searching a plurality of bitmap pages corresponding to the first primary summary entry and the second primary summary entry for a first plurality of contiguous free storage blocks for the allocation request; and transmitting an indication identifying the first plurality of contiguous free storage blocks to satisfy the allocation request.

2. The method of claim 1, further comprising:
executing the allocation request to store data in the first plurality of contiguous free storage blocks.

3. The method of claim 1, further comprising:
marking bits of the plurality of bitmap pages as allocated; and decreasing the count of free storage blocks and the indication of size of the largest contiguous set of free storage blocks of each of the first secondary summary entry, the first primary summary entry, and the second primary summary entry.

4. The method of claim 1, wherein the allocation request for the plurality of blocks from the storage system is performed using a first-fit allocation scheme within O(log(N)) time.

5. A non-transitory computer-readable storage medium comprising instructions that, when executed in a computing device, manage space allocation for the computing device, by performing steps comprising:

receiving an allocation request for a plurality of blocks from a storage system;

searching a plurality of secondary summary entries for a secondary summary entry indicating sufficient contiguous free storage blocks for the allocation request, wherein each of the secondary summary entries corresponds to a plurality of primary summary entries, wherein each of the secondary summary entries comprises (i) an aggregate count of free storage blocks as summarized by a plurality of entries in the corresponding plurality of primary summary entries and (ii) an indication of a size of a largest contiguous set of free storage blocks among storage blocks corresponding to the corresponding plurality of primary summary entries;

identifying, based on searching the plurality of secondary summary entries, a first secondary summary entry corresponding to a first plurality of primary summary entries comprising a first primary summary entry and a second primary summary entry, wherein for the first secondary summary entry, storage blocks of the largest contiguous set of free storage blocks correspond to storage blocks associated with the first primary summary entry and to storage blocks associated with the second primary summary entry;

based on identifying the first secondary summary entry, searching the first plurality of primary summary entries for a primary summary entry indicating sufficient contiguous free storage blocks for the allocation request, wherein each of the primary summary entries corresponds to a respective bitmap page comprising a plurality of bits, each of the bits corresponding to a respective storage block and indicating whether the corresponding storage block is free, and wherein each of the primary summary entries comprises (i) a count of free storage blocks indicated by the corresponding bitmap page and (ii) an indication of a size of a largest contiguous set of free storage blocks indicated by the corresponding bitmap page, the indication of the largest contiguous set of free storage blocks being distinct from the count of the free storage blocks;

based on not identifying a single primary summary entry of the first plurality of primary summary entries indicating sufficient contiguous free storage blocks for the allocation request, searching a plurality of bitmap pages corresponding to the first primary summary entry and the second primary summary entry for a first plurality of contiguous free storage blocks for the allocation request; and transmitting an indication identifying the first plurality of contiguous free storage blocks to satisfy the allocation request.

6. The non-transitory computer-readable storage medium of claim 5, wherein the steps further comprise:
marking bits of the plurality of bitmap pages as allocated; and decreasing the count of free storage blocks and the indication of size of the largest contiguous set of free storage blocks of each of the first secondary summary entry, the first primary summary entry, and the second primary summary entry.

7. The non-transitory computer-readable storage medium of claim 5, wherein the allocation request for the plurality of blocks from the storage system is performed using a first-fit allocation scheme within O(log(N)) time.

8. A computer system for allocating storage space, the computer system comprising:
a storage device;
a processor (CPU) configured to perform steps comprising:

receiving an allocation request for a plurality of blocks from the storage device, searching a plurality of secondary summary entries for a secondary summary entry indicating sufficient contiguous free storage blocks for the allocation request, wherein each of the secondary summary entries corresponds to a plurality of primary summary entries, wherein each of the secondary summary entries comprises (i) an aggregate count of free storage blocks as summarized by a plurality of entries in the corresponding plurality of primary summary entries and (ii) an indication of a size of a largest contiguous set of free storage blocks among storage blocks corresponding to the corresponding plurality of primary summary entries;

identifying, based on searching the plurality of secondary summary entries, a first secondary summary entry corresponding to a first plurality of primary summary entries comprising a first primary summary entry and a second primary summary entry, wherein for the first secondary summary entry, storage blocks of the largest contiguous set of free storage blocks correspond to storage blocks associated with the first primary summary entry and to storage blocks associated with the second primary summary entry;

based on identifying the first secondary summary entry, searching the first plurality of primary summary entries for a primary summary entry indicating sufficient contiguous free storage blocks for the allocation request, wherein each of the primary summary entries corresponds to a respective bitmap page comprising a plurality of bits, each of the bits corresponding to a respective storage block and indicating whether the corresponding storage block is free, and wherein each of the primary summary entries comprises (i) a count of free storage blocks indicated by the corresponding bitmap page and (ii) an indication of a size of a largest contiguous set of free storage blocks indicated by the corresponding bitmap page, the indication of the largest contiguous set of free storage blocks being distinct from the count of the free storage blocks;

based on not identifying a single primary summary entry of the first plurality of primary summary entries indicating sufficient contiguous free storage blocks for the allocation request, searching a plurality of bitmap pages corresponding to the first primary summary entry and the second primary summary entry for a first plurality of contiguous free storage blocks for the allocation request; and transmitting an indication identifying the first plurality of contiguous free storage blocks to satisfy the allocation request.

9. The computer system of claim 8, wherein the processor is further configured to perform the steps of:

marking bits of the plurality of bitmap pages as allocated; and decreasing the count of free storage blocks and the indication of size of the largest contiguous set of free storage blocks of each of the first secondary summary entry, the first primary summary entry, and the second primary summary entry.

* * * * *